(12) United States Patent
Svanholm et al.

(10) Patent No.: US 8,396,681 B2
(45) Date of Patent: Mar. 12, 2013

(54) PREDICTION ALGORITHM FOR SCANNING AN OBJECT

(75) Inventors: Set Svanholm, Sollentuna (SE);
Grégory Lepere, Sevran (FR);
Guillaume David, Noisy-le-Grand (FR);
Fredrik Gylesjö, Täby (SE); Sven Johansson, Täby (SE); Björn Magnusson, Danderyd (SE)

(73) Assignee: Trimble AB, Danderyd (SE)

( * ) Notice: Subject to any disclaimer, the term of this patent is extended or adjusted under 35 U.S.C. 154(b) by 620 days.

(21) Appl. No.: 12/448,973

(22) PCT Filed: Jan. 25, 2007

(86) PCT No.: PCT/EP2007/000626
§ 371 (c)(1),
(2), (4) Date: Nov. 9, 2009

(87) PCT Pub. No.: WO2008/089788
PCT Pub. Date: Jul. 31, 2008

(65) Prior Publication Data
US 2010/0070229 A1 Mar. 18, 2010

(51) Int. Cl.
*G01C 17/38* (2006.01)
*G01C 1/00* (2006.01)
*G01B 11/14* (2006.01)

(52) U.S. Cl. .............................. 702/94; 33/1 T; 356/616

(58) Field of Classification Search .................... 702/94, 702/33, 81, 84–85, 95, 97, 127, 150–156, 702/158–159, 166, 172, 182–183, 189, 196; 33/1 N, 1 T, 1 V, 1 CC, 281–282, 284–285, 33/290, 700–702, 706–707; 356/138, 139.04, 356/147, 600–601, 606–608, 614–616, 625–629
See application file for complete search history.

(56) References Cited

U.S. PATENT DOCUMENTS

| 5,815,275 A | 9/1998 | Svetkoff et al. ................ 356/608 |
| 2002/0158870 A1 | 10/2002 | Brunkhart et al. ............ 345/424 |
| 2010/0315618 A1* | 12/2010 | Hertzman .................... 356/5.01 |

FOREIGN PATENT DOCUMENTS

| EP | 1 574 821 | 9/2005 |
| WO | WO 2004/057269 | 7/2004 |

OTHER PUBLICATIONS

Guarnieri et al., Photogrammetry and Ground-based Laser Scanning: Assessment of Metric Accuracy of the 3D Model of Pozzoveggiani Church, May 22-27, 2004, TS26 Positioning and Measurement Technologies and Practices II—Laser Scanning and Photogrammetry, FIG Working Week 2004, 15 pp.*
English translation of Chinese Office Action dated Apr. 30, 2010.

* cited by examiner

*Primary Examiner* — Toan Le
(74) *Attorney, Agent, or Firm* — Harness, Dickey & Pierce, P.L.C.

(57) ABSTRACT

A distance measuring measurement instrument and a method for such a station for scanning a surface or volume of an object are disclosed. The measurement instrument includes a position calculating circuit adapted to calculate position data including at least horizontal and vertical angle and distance between the measurement instrument and the object. A plurality of points in each of a number of subsets of a scanning area of the object during a measurement session and, at detection of a new point in the new subset, information related to at least one point having a corresponding location in at least one preceding subset is used, wherein the preceding subset being adjacent to the new subset.

19 Claims, 6 Drawing Sheets

PREDICTION ALGORITHM FOR SCANNING AN OBJECT

FIELD OF THE INVENTION

The present invention generally relates to systems and methods for surveying and more specifically to a distance measuring surveying unit and a method for such a unit for scanning a surface or volume of an object.

BACKGROUND

The art of surveying involves the determination of unknown positions, surfaces or volumes of objects or setting out of known coordinates using angle and distance measurements taken from one or more positions. In order to make these measurements, a surveying device frequently used is a distance measuring instrument with an integrated distance and angular measurement of the type which is called a total station, i.e. with combined electronic, optical and computer techniques. A total station is furthermore provided with a computer or control unit with writable information for measurements to be performed and for storing data obtained during the measurements. Preferably, the total station calculates the position of a target in a fixed ground-based coordinate system. In, for example, WO 2004/057269 by the same applicant, such a total station is described in more detail.

When performing distance measuring or surveying tasks using a distance measuring total station at a work site, naval work site, a construction work site or a mining work site, it is often desirable to measure a surface or volume of an object being present on the work site. In such a work site, it may, for example, often be desirable to scan a surface of an object, for example, a wall of a building to obtain an image of the wall. Furthermore, at, for example, a mining work site it may be desirable to scan a volume of a certain part of rock to be removed to obtain a measure of the volume in order to determine a required transport capacity. Another example is at a construction work site where it may be desirable to scan the volume of a pile of material to obtain a measure of the object in order to determine the required transport capacity.

The total station is normally equipped with a so called tracking filter that is able to follow moderate distance changes over time, for example, 10 or 15 meter/second when turning the station or when a moving target is followed. However, when scanning a surface of an object such as a building, the total station must be capable of coping with abrupt distance and/or signal strength changes, for example, when the total station aims at a window or at the sky when scanning, for example, the roof.

Accordingly, there is a need of an improved and more efficient total station and a method for such a station for use at such a work site, e.g. for scanning purposes, that is capable of coping with abrupt distance and/or signal strength changes.

SUMMARY OF THE PRESENT INVENTION

Thus, an object of the present invention is to provide an improved and more efficient measurement instrument and a method for such an instrument for use at such a work site, e.g. for scanning purposes, that is capable of coping with, for example, abrupt distance and/or signal strength changes.

Another object of the present invention is to provide a measurement instrument and a method for such a measuring instrument for scanning a surface or volume of an object in a fast and reliable way.

A further object of the present invention is to provide a measurement instrument and a method for such a measurement instrument for increasing the accuracy of the measurements.

These and other objects of the present invention are achieved by means of methods, a system, a measurement instrument, and a computer program product having the features defined in the independent claims. Preferable embodiments of the invention are characterized by the dependent claims.

In order to clarify, the term "measurement instrument" used herein refers to a distance measuring instrument with an integrated distance and angular measurement, i.e. with combined electronic, optical and computer techniques. Such an instrument gives both the distance as well as the vertical and horizontal direction angle towards a target, whereby the distance is measured against an object or reflector.

According to an aspect of the present invention, there is provided a method for determining a surface or a volume of an object using a measuring instrument. The method comprises the step of: identifying a scanning area of an object including the surface; dividing the scanning area into a number of subsets; detecting a plurality of points in each of the subsets of the scanning area of the object during a measurement session, the points of the subsets forming a scanning point grid configuration; and at detection of a new point in the new subset, using information related to at least one point having a corresponding location in at least one preceding subset, the preceding subset being adjacent to the new subset.

According to a second aspect of the present invention, there is provided a measuring instrument for determining a surface or a volume of an object comprising a position calculating circuit adapted to calculate position data including at least horizontal and vertical angle and distance between the measuring instrument and the object. The measuring instrument further comprises a control unit adapted to: instruct the position calculation circuit to identify a scanning area of an object including the surface; instruct the position calculation circuit to divide the scanning area into a number of subsets; obtain a plurality of points in each of the subsets of the scanning area of the object detected by the position calculation circuit during a measurement session, the points of the subsets forming a scanning point grid configuration; and at detection of a new point in the new subset, instruct the position calculation circuit to use information related to at least one point having a corresponding location in at least one preceding subset, the preceding subset being adjacent to the new subset.

According to a third aspect of the present invention, there is provided a computer program product, directly loadable into an internal memory of a measuring instrument according to the second aspect of the present invention, comprising software code portions for causing a control unit of the measuring instrument to perform steps in accordance with the first aspect of the present invention.

The present invention is based on the idea of dividing a scanning area of a target or an object into subsets and using the information, e.g. distance or signal strength, related to the nearest measured point (or a number of neighbouring points) in a previously scanned subset to define ranges for different properties, e.g. distance range, to the target or object when measuring a new point in a new adjacent subset. Thus, a subset with a certain point density is scanned and the information of these points is used when the next or adjacent subset to the previous subset is scanned.

The present invention achieves a number of advantages. For example, the scanning procedure can be made more efficient and more reliable since a better prediction can be made.

Furthermore, the measuring time can be reduced significantly in comparison to prior art where the information from other points is not taken into account and thereby the time required to measure a point with lowest S/N ratio must be used as a time-out for all points. According to the invention, the measuring time from adjacent points is used and, for example, the longest time with a valid distance, e.g. not the sky, can be used as timeout plus a time offset to be able to cope with weaker points.

Moreover, if the distance to the points of the object is expected to increase drastically, e.g. at the gable of a house or building, the use of points in at least the previous subset can optimize the performance of the scanning procedure.

According to an embodiment of the present invention, the subsets are parallel scan lines.

In embodiments of the present invention, a correction measurement session is performed after a surface or volume of an object or target has been scanned. A plurality of points in each of a number of correction subsets of the scanning area of the object are detected, wherein the correction subsets may be the same subsets used in the first measurement session or the correction subsets may be geometrically orthogonal relatively to the subsets obtained during the first measurement session. Information related to at least one point having a corresponding location in at least one preceding correction subset is used, wherein the preceding correction subset is adjacent to a new correction subset.

In another embodiment, only selected points are scanned during the correction measurement session. For example, only missed points during the first measurement session are scanned during the correction measurement session. The user may select which points to scan during the correction measurement session or the selection may be automatically, wherein predetermined criteria may be used to determine which point to scan again. That is, it may be checked whether predetermined accuracy parameters are satisfied, e.g. whether a number of failed points of the detected subsets is below a predetermined level. This may be performed by default, on request of the user (i.e. as a response on a manually inputted command), or after a test wherein the measured points are compared with certain accuracy parameters. The accuracy parameters may be a level of completion. For example, a point may have been identified but a measurement may not have been conducted. Data related to such a point having a lower level of completion may be used in an error correction procedure. Thus, the information, e.g. distance or signal strength, related to the nearest measured point (or a number of neighbouring points) in at least a previously scanned subset is used to define ranges for different properties, e.g. distance range, to the target or object when measuring a new point in a new adjacent subset. That is, a subset with a certain point density is scanned and the information of these points is used when the next or adjacent subset to the previous subset is scanned. It is consequently possible to achieve an even higher degree of accuracy by performing an error correction procedure. This error correction information is used in combination with the first point grid configuration where, for example, certain points in the original grid configuration can be replaced with points obtained during the error correction measurement.

In certain embodiments, the measurement instrument is a total station. According to other embodiments, the measurement instrument is a three-dimensional scanning device.

As realized by the person skilled in the art, steps of the methods of the present invention, as well as preferred embodiments thereof, are suitable to realize as a computer program or a computer readable medium.

The features that characterize the invention, both as to organization and to method of operation, together with further objects and advantages thereof, will be better understood from the following description used in conjunction with the accompanying drawings. It is to be expressly understood that the drawings is for the purpose of illustration and description and is not intended as a definition of the limits of the invention. These and other objects attained, and advantages offered, by the present invention will become more fully apparent as the description that now follows is read in conjunction with the accompanying drawings.

BRIEF DESCRIPTION OF THE DRAWINGS

In the following detailed description, reference will be made to the accompanying drawings, of which.

DETAILED DESCRIPTION OF THE PRESENT INVENTION

Figure 1:
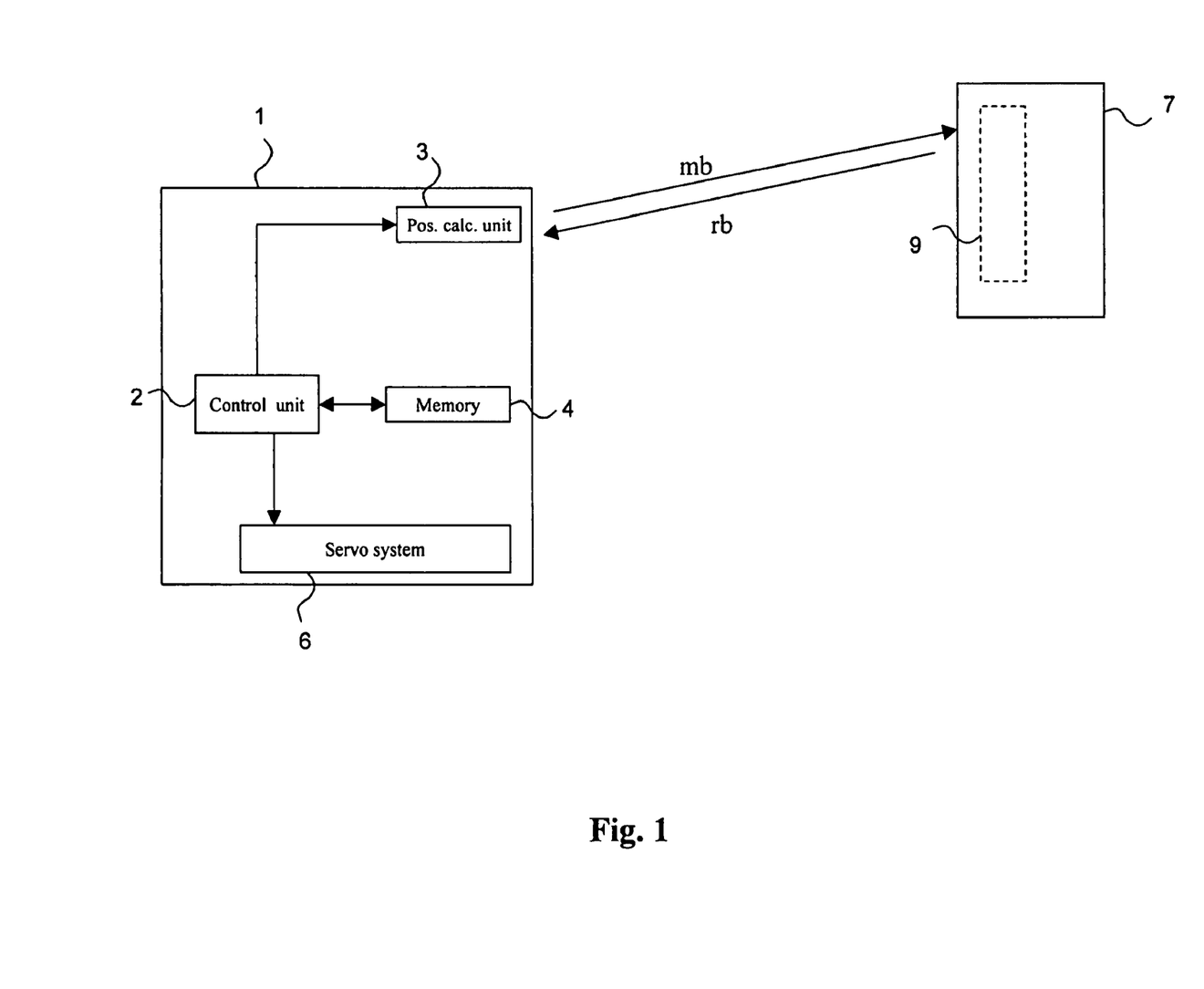
FIG. 1 illustrates an embodiment of a measurement instrument according to the present invention.

With reference first to FIG. 1, an embodiment of a measurement instrument according to the present invention will be discussed. In this embodiment, the measurement instrument is a total station or geodetic instrument. The present invention may also be implemented in a three dimensional scanning device.

The total station is a distance measuring instrument with an integrated distance and angular measurement, i.e. with combined electronic, optical and computer techniques. Such a total station gives both the distance as well as the vertical and horizontal direction towards an object or a target, whereby the distance is measured against a reflecting surface or a reflector, e.g. of the corner cube type. A total station is furthermore provided with a computer or control unit with information for measurements to be performed and for storing data obtained during the measurements. Preferably, the total station calculates the position of a target in a fixed ground-based coordinate system. In, for example, WO 2004/057269 by the same applicant, such a total station is described in more detail.

The total station 1 includes a control unit 2, including a control logic, and a position calculation circuit 3 including arrangements for sending out measuring beams mb for distance and alignment measurements and sensor arrangements for receiving reflected beams rb from an object or a target 7. Moreover, the total station 2 comprises a memory circuit 4, which memory circuit 4 may include a random access memory (RAM) and/or a non-volatile memory such as a read-only memory (ROM).

The total station 1 further includes a servo system 6 connected to the control unit 2 used to control the movement of the total station 1. The control unit 2 controls, inter alia, servo motors of the servo system 6 to move the total station 2, for example, to track a moving target or to scan a surface or volume of the object 7.

Furthermore, the control unit 2 is adapted to control the position calculation circuit 3 during a measurement session in order to scan an area 9 of a surface of an object 7. During the measurement session, a plurality of detected points are obtained for each of a number of subsets of the scanning area 9 of the object 7 during a measurement session, which will be described in more detail below with reference to FIGS. 2 and 3. As will be discussed hereinafter, the scanning area 9 may be defined or determined by a user of the total station 1 and may include one or more polygonally shaped areas. For example, the scanning area may be rectangular or square-shaped. Similarly, the subsets of the scanning area may be predetermined or defined by the user. According to one embodiment, the subsets are parallel lines.

Furthermore, the total station 1 may comprise a display (not shown) for presenting information visually for a user by means of a graphical user interface (GUI) such as a result of a scanned area and an input device (not shown), for example, a keyboard, which enable a user to, for example, input information and commands.

Turning now to FIGS. 2, 3, 4, 5, and 6, an embodiment of the method for scanning a surface or volume of an object according to the present invention will be discussed. For example, at a construction site the present invention may be used for estimating a stockpile volume or for scanning a surface of a building and in a mining site it may be used for estimating mining volumes. First, at step 20, a scanning area 31 of an object 30, in this example, see FIG. 3, a building 33 with a sloping roof 32, is identified. A user of the total station 1 may define the scanning area 31, see FIGS. 3 and 5, using the input device. For example, the scanning area 31 may be rectangular or square-shaped. Further, the user may define criteria for the measurement procedure, for example, a resolution of the scanning points of the scanning area or a total scanning time for the scanning area. Then, at step 21, the scanning area is divided into a number of subsets s1, s2, . . . , sy, see FIG. 3. This may be performed automatically by the process using predetermined settings. For example, the subsets may parallel lines of scanning points. Alternatively, the subsets of the scanning area may be defined manually by the user.

Figure 2:
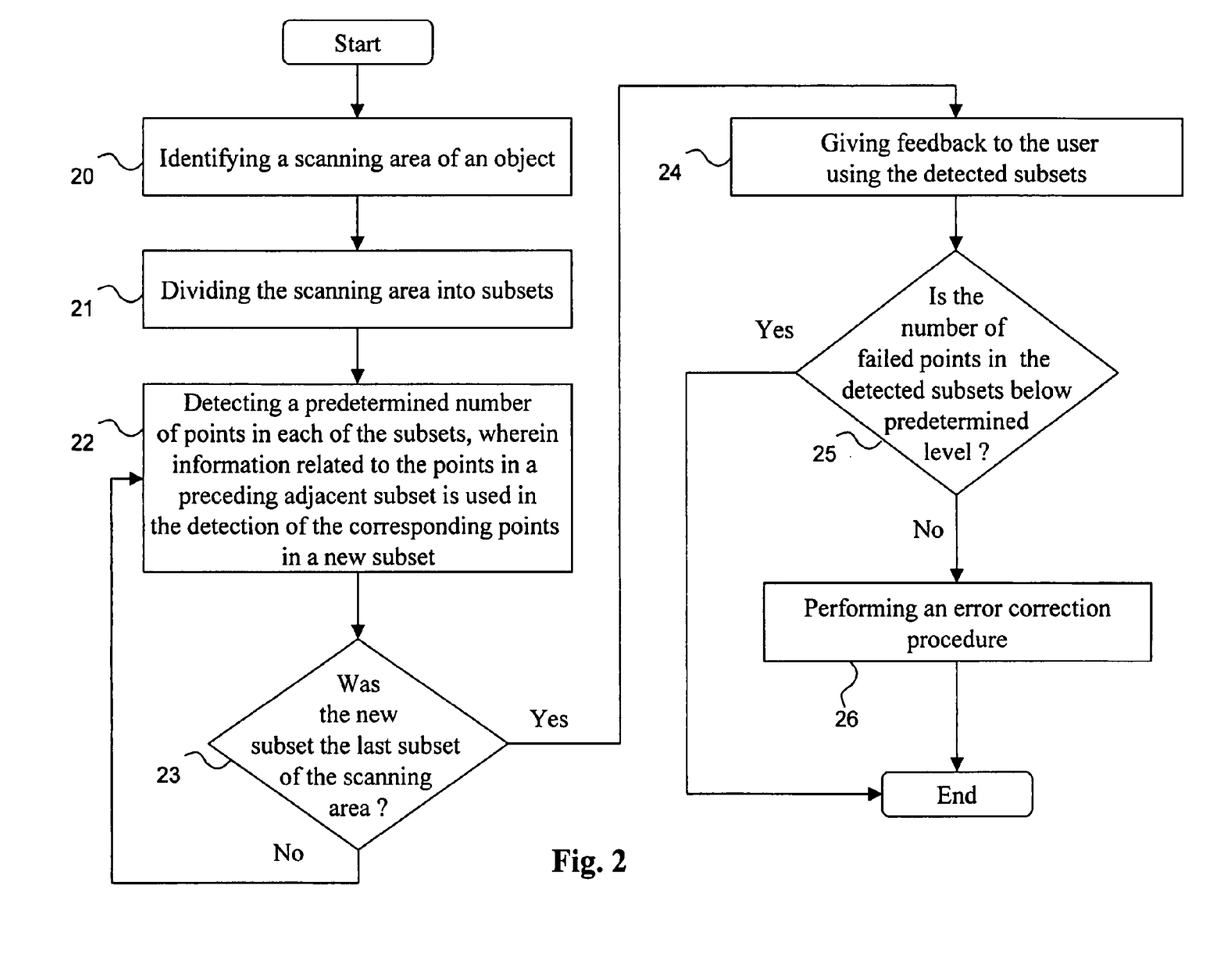
FIG. 2 is a flow chart illustrating one embodiment of the scanning procedure in accordance with the teachings of the present invention.

Thereafter, at step 22, the scanning procedure is started and a first subset s1 of points P1s1, P2s1, . . . , Pxs1 are measured by the total station and are stored in a scanning point grid configuration, temporarily in a buffering memory of the control circuit 2 or in the memory circuit 4 of the total station 1. When the second subset s2 is scanned, information related to at least one point having a corresponding location in at least one preceding adjacent subset is used. That is, when measuring the first point P1s2 of the second subset, information related to the point having a corresponding position in the adjacent subset, namely point P1s1, is used including distance, signal strength and measuring time. For example, a time-out may be set using the measuring time of P1s2, in other words, a most likely time interval within which the measuring time for P1s2 should be may be set. This parameter is useful, for example, when scanning the roof 32 of the building 33, see FIG. 3. When measuring the point Pxs1, the measuring time will be very long since the total station 1 aims at the sky, i.e. above the sloping roof 32. However, this can be utilized when measuring the corresponding point Pxs2 in the adjacent subset s2. For example, a maximum time limit can be set and, hence, the scanning procedure will move on to the next point as soon as the set time limit has expired. Accordingly, the scanning procedure can be sped up significantly.

Figure 3:
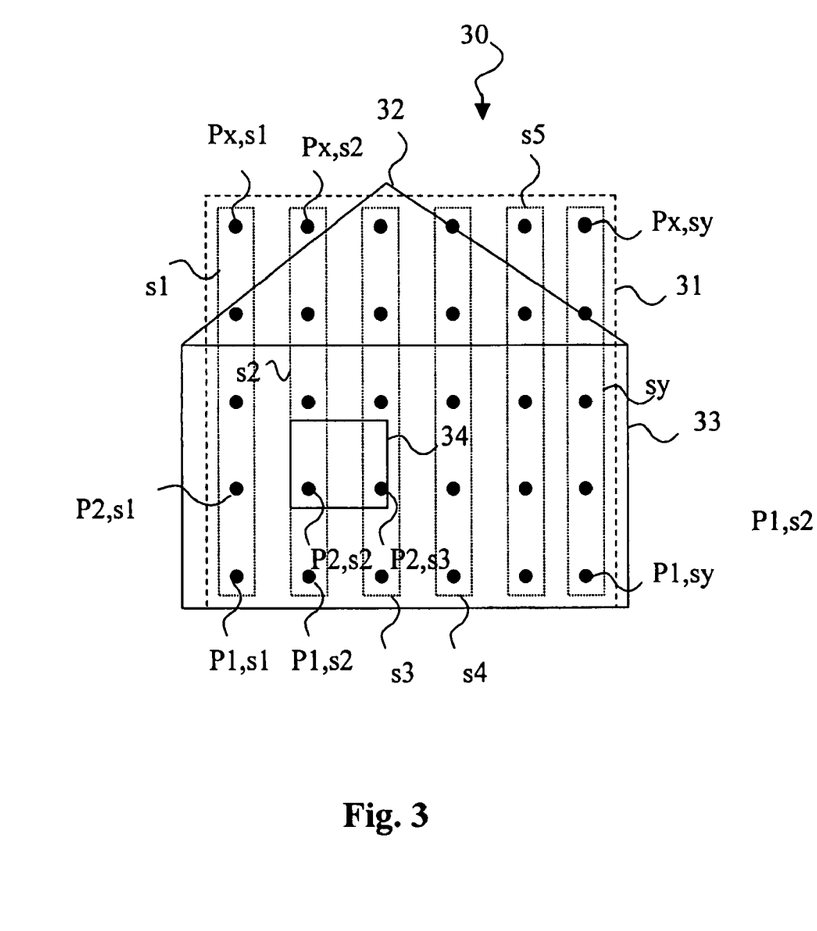
FIG. 3 illustrate an example scanning area and scanning area subsets used in the scanning procedure illustrated in FIG. 2.

Alternatively, or in combination with the measuring time, the signal strength can be used. This may be useful, for example, when measuring points where a majority is at a dark wall 33 of the building, and thus will have a low signal strength since the reflectance of the dark wall is low, and others are at a metal area 34 (e.g. a sign) having a surface with a high reflectance and thus will have a high signal strength. Hence, when measuring the point P2s2, the signal strength will be high, which may be utilized when measuring the point P2s3. That is, the scanning procedure may set a likely signal strength or upper and lower limits of the signal strength for the neighbouring point at the corresponding location in the adjacent subset, namely P2s3, based on the signal strength of P2s2.

As the person skilled within the art easily realizes, there are a number of conceivable variations of the measurement procedure. For example, the information of two or more points in an adjacent subset may be used when measuring a new point in the new subset. In the above example, the information of points P1s1 and P2s1 could be used when measuring point P1s2, thus, the point at the corresponding location and one or more neighbouring points in the adjacent subset. Moreover, information from more than one preceding subset may be used when measuring a new point in the new subset.

Subsequently, at step 23, it is checked whether the latest scanned subset was the last subset of the scanning area 30. If no, the process returns to step 22 where the scanning procedure continuous. If yes, the process proceeds to step 24, where the user is provided with a feedback of the scanning procedure, i.e. a result is created using the points gathered in a scanning point grid configuration:

$$\text{scanning point grid configuration} = \begin{bmatrix} P1s1 & P2s1 & \cdots & Pxs1 \\ P1s2 & P2s2 & \cdots & Pxs2 \\ \cdots & \cdots & \cdots & \cdots \\ P1sy & P2sy & \cdots & Pxsy \end{bmatrix}$$

In this example, the points are gathered in a fixed grid configuration, i.e. in matrix form, but, as the skilled person realizes, it is only exemplary. For example, points of successive scan lines may be collected in different grids.

The result may be presented for a user on the display of the total station 1 or may be sent, for example, via a RF unit or a cable connection to a computer where the result can be presented on the display screen. The creation of the result from the scanned points can be made by means of any conventional technique used within the art.

Then, at step 25, a check may be performed whether accuracy parameters are satisfied, e.g. whether a number of failed points of the detected subsets is below a predetermined level. This may be perform by default, on request of the user (i.e. as a response on a manually inputted command), or after a test wherein the measured points are compared with certain accuracy parameters. The accuracy parameters may be a level of completion. For example, a point may have been identified but a measurement may not have been conducted. Data related to such a point having a lower level of completion may be used in an error correction procedure.

If the result, or the points of the scanning point grid configuration, is found to satisfy the accuracy criteria (or if the user approves the result), the scanning procedure is finished. On the other hand, if no, the process proceeds to step 26 where an error correction procedure is performed, which will be described hereinafter with reference to FIGS. 4, 5 and 6.

Figure 4:
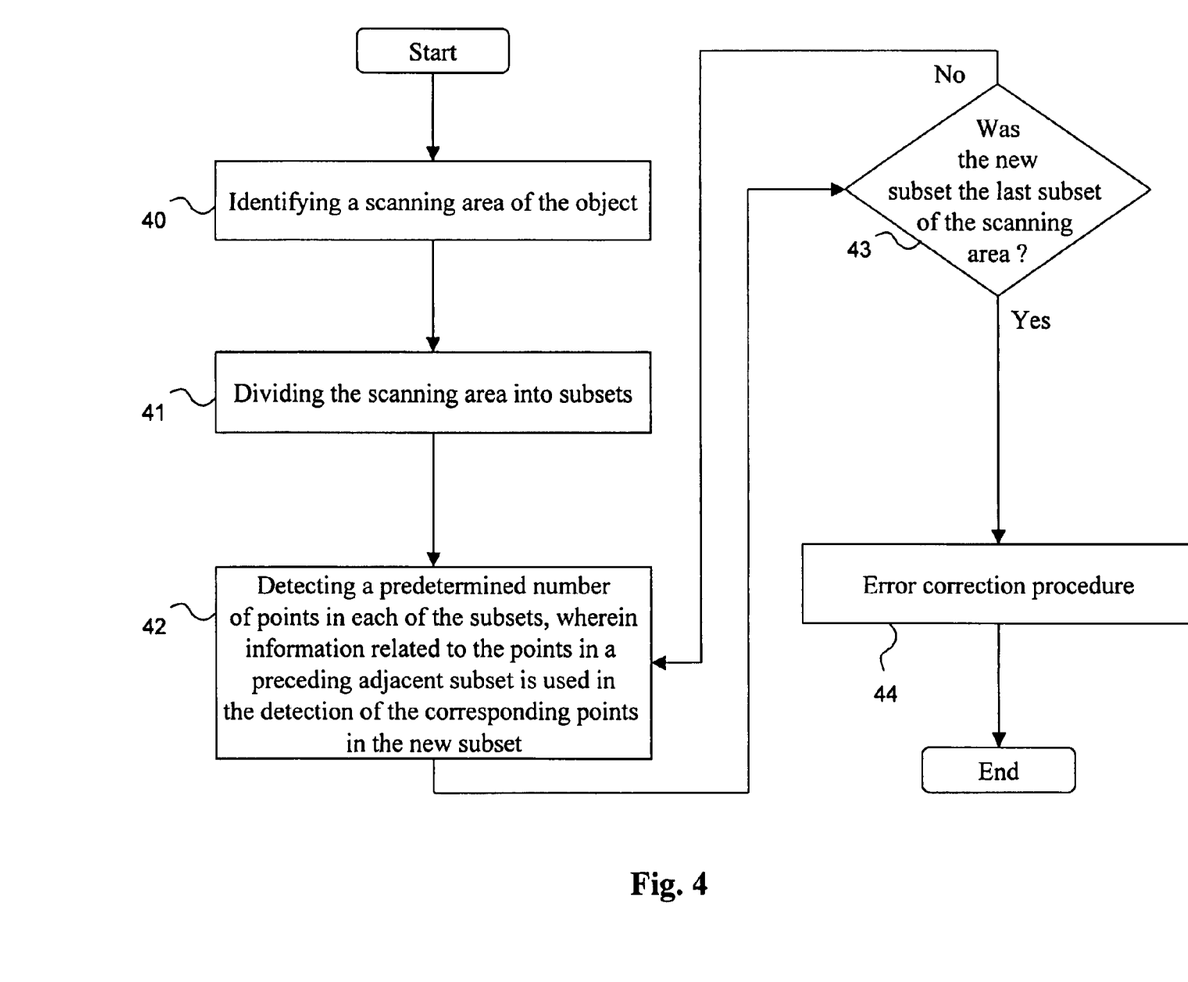
FIG. 4 is a flow chart illustrating one embodiment of the error correction procedure in accordance with the teachings of the present invention.
Figure 5:
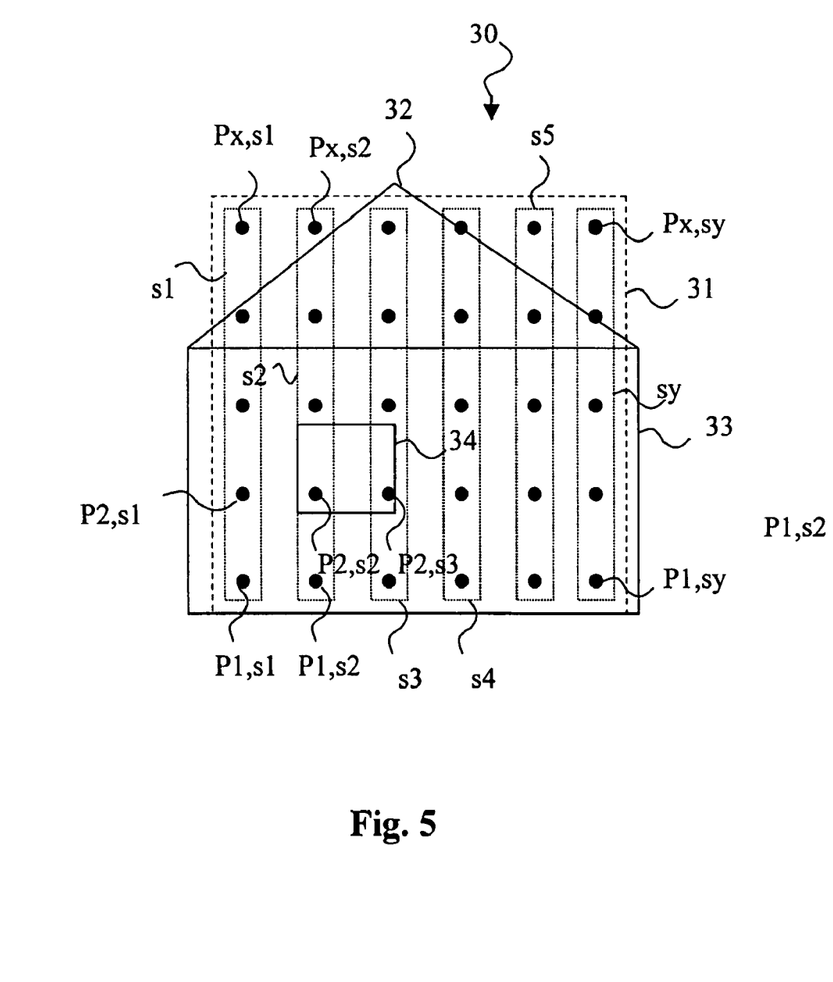
FIG. 5 illustrates an example scanning area and scanning area subsets used in the error correction procedure illustrated in FIG. 4.
Figure 6:
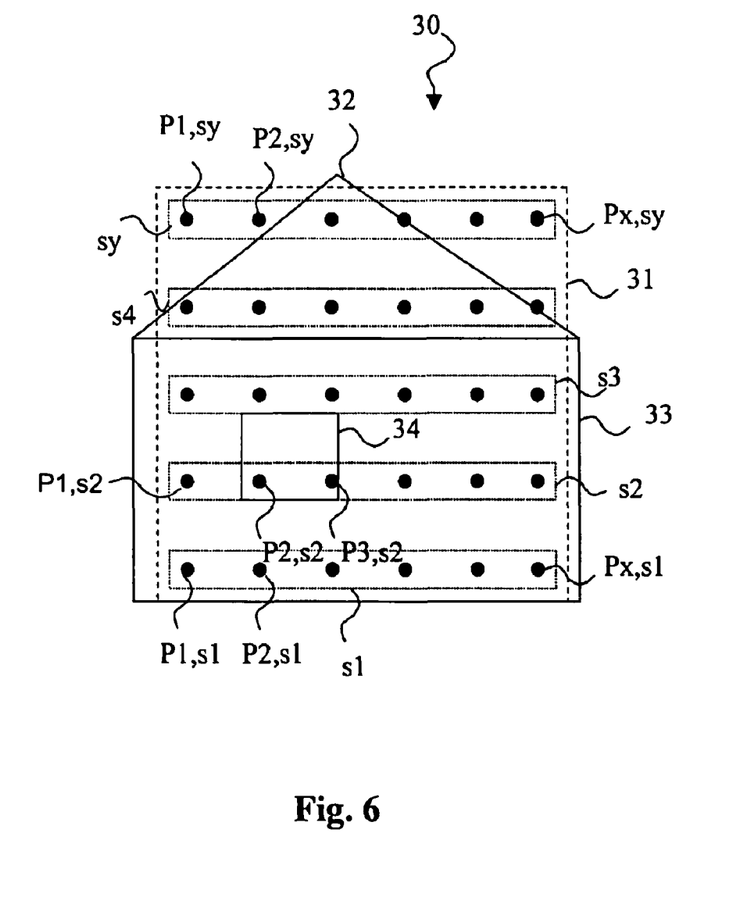
FIG. 6 illustrates the scanning area of FIG. 4 and another example of scanning area subsets used in the error correction procedure illustrated in FIG. 4.

Turning now to FIG. 4, the scanning area 31 of an object 30, in this example, see FIG. 5, a building 33 with a sloping roof 32, is first identified at step 40. The scanning area 31 is preferably the same in the scanning procedure and the error correction procedure. Further, the criteria for the measurement procedure, for example, a resolution of the scanning points of the scanning area or a total scanning time for the scanning area is also preferably the same. Then, at step 41, the scanning area is divided into a number of subsets s1, s2, . . . , sy, see FIG. 5. This may be performed automatically by the process using predetermined settings. In another embodiment, the same lines as in the scanning procedure are used in the error correction procedure, see FIG. 5. According to an embodiment, the subsets used in the error correction are geometrically orthogonal to the subsets in the scanning procedure as can be seen in FIGS. 3 and 6. According to further embodiments, the user may, or it may be performed automatically, select points to be measured during the error correction. Points obtained in the error correction are used in combination with the first point grid configuration where, for example, certain points in the original grid configuration can be replaced with points obtained during the error correction measurement, missing points in the first grid configuration can be complemented by points obtained during the error correction measurement, or points in the first grid configuration having a too low level of completion (e.g. that the number of failed points is below a predetermined level) can be replaced with points obtained during the error correction measurement. Data related to the points in the first grid configuration may be used in the measurement of the points during the error correction.

Thereafter, at step 42, the scanning procedure is started and a similar scanning procedure is performed as described above. Thus, a first subset s1 of points P1s1, P2s1, . . . , Pxs1 are measured by the total station and are stored in a scanning grid configuration, temporarily in a buffering memory of the control circuit 2 or in the memory circuit 4 of the total station 1. When the second subset s2 is scanned, information related to at least one point having a corresponding location in at least one preceding adjacent subset is used. That is, when measuring the first point P1s2 of the second subset, information related to the point having a corresponding position in the adjacent subset, namely point P1s1, is used including distance, signal strength and measuring time. Furthermore, information related to a corresponding point of the scanning point matrix shown above may be used when scanning the same point during the error correction. For example, if the point was identified but not measured during the first scanning procedure. That is, information related to point P1s1 obtained during the first scanning procedure may be used when scanning the same point P1s1 during the error correction.

In another embodiment, only points that were missed or that did not fulfil predetermined accuracy parameters are scanned during the error correction procedure. As discussed above, this may be performed automatically or the user may select the points to be scanned or measured during the error correction procedure.

Then, at step 43, it is checked whether the latest scanned subset was the last subset of the scanning area 30. If no, the process returns to step 22 where the scanning procedure continuous. If no, the process proceeds to step 44, where an error correction is performed using the points gathered in the error correction scanning point grid configuration, which in this example is a matrix:

$$\text{Error corrected scanning point matrix} = \begin{bmatrix} P1s1 & P2s1 & \cdots & Pxs1 \\ P1s2 & P2s2 & \cdots & Pxs2 \\ \cdots & \cdots & \cdots & \cdots \\ P1sy & P2sy & \cdots & Pxsy \end{bmatrix}$$

In this example, the points are gathered in a matrix form, but, as the skilled person realizes, it is only exemplary. For example, points of successive scan lines may be collected in different grids.

As understood, the same points may have been scanned using the two orthogonally arranged sets of subsets and, thus, there may be two measurements for all or for some points.

Finally, the error corrected result can be presented for the user on the display of the total station 1 or may be sent, for example, via an RF unit (not shown) to a computer where the result can be presented on the display screen.

Although an exemplary embodiment of the present invention has been shown and described, it will be apparent to those having ordinary skill in the art that a number of changes, modifications, or alterations to the inventions as described herein may be made. Thus, it is to be understood that the above description of the invention and the accompanying drawings is to be regarded as a non-limiting example thereof and that the scope of protection is defined by the appended patent claims.

The invention claimed is:

1. A method for scanning a surface or a volume of an object using a measurement instrument, the measuring instrument including a position calculating circuit to calculate position data including at least horizontal and vertical angle and distance between the measurement instrument and the object, the measuring instrument further including a control module, the method comprising:
    identifying, by the control module, a scanning area of the object including the surface;
    dividing, by the control module, the scanning area into a number of subsets;
    measuring, by the position calculating circuit, the subsets in sequence during a measurement session;
    detecting, by the control module, a plurality of points in each of the number of subsets of said sequence of the scanning area of the object during the measurement session, the plurality of points of the subsets forming a scanning point grid configuration;
    using, by the control module and upon detection of a new point in a new subset in said sequence, information related to at least one point having a corresponding location in at least one preceding subset in said sequence; and
    providing, by the control module, a scanning result based on the scanning point grid configuration.

2. The method according to claim 1, wherein the subsets are parallel scan lines, and wherein the using of information comprises:
    using information related to at least one point having a corresponding location in at least one preceding scan line, the preceding scan line being adjacent to a new scan line, in the detection of a point on the new scan line.

3. The method according to claim 2, wherein the using of information comprises:
    using measurement parameters of the at least one point having a corresponding location in at least one preceding scan line in the detection of a point on the new scan line, the measurement parameters including at least one of signal strength of the point, distance from the measurement instrument to the point and measurement time for the point.

4. The method according to claim 3, wherein the using of information further comprises:
defining measurement properties for the detection of each point on the new scan line based on the measurement parameters of the at least one point having a corresponding location in at least one preceding scan line.

5. The method according to claim 4, wherein the defining of measurement properties comprises:
setting at least one parameter including any one of a distance range, any one of upper and lower signal strength limits, any one of upper and lower measurement time limits for the detection of each point on the new scan line based on said measurement parameters of the at least one point having a corresponding location in at least one preceding scan line.

6. The method according to claim 1, further comprising:
performing a correction measurement session including;
detecting a plurality of points in each of a number of correction subsets of the scanning area of the object; and
using, at detection of a new point in the new subset, information related to at least one point having a corresponding location in at least one preceding correction subset.

7. The method according to claim 6, wherein the performing of a correction measurement session further comprises:
using information related to a point having a corresponding or adjacent location in a subset obtained during a preceding measurement session.

8. The method according to claim 1, wherein the identifying of a scanning area of an object further comprises:
defining the scanning area, wherein the scanning area includes at least one polygonally shaped area.

9. The method according to claim 1, wherein said dividing of the scanning area further comprises:
defining one of a resolution of the points of the scanning area and a total scanning time for the scanning area.

10. A non-transitory computer readable medium including program segments for, when executed on a computer device, causing the computer device to implement the method of claim 1.

11. A measurement instrument for scanning a surface or a volume of an object, including a position calculating circuit to calculate position data, the position data including at least horizontal and vertical angle and distance between the measurement instrument and the object, the measurement instrument comprising a control unit configured to:
instruct the position calculating circuit to identify a scanning area of an object including said surface;
instruct the position calculating circuit to divide said scanning area into a number of subsets;
instruct the position calculating circuit to measure the subsets in sequence during a measurement session;
obtain a plurality of points in each of said subsets in said sequence of said scanning area of said object detected by said position calculating circuit during the measurement session, said points of said subsets forming a scanning point grid configuration;
upon detection of a new point in a new subset in said sequence, instruct the position calculating circuit to use information related to at least one point having a corresponding location in at least one preceding subset in said sequence; and
provide a scanning result based on said scanning point grid configuration.

12. The measurement instrument according to claim 11, wherein said subsets are parallel scan lines, and wherein the control unit is configured to instruct the position calculating circuit to use information related to at least one point having a corresponding location in at least one preceding scan line, said preceding scan line being adjacent to a new scan line in said grid configuration, in the detection of a point on said new scan line.

13. The measurement instrument according to claim 12, wherein said control unit is configured to instruct the position calculating circuit to use measurement parameters of said at least one point having a corresponding location in at least one preceding scan line in the detection of a point on said new scan line, said measurement parameters including at least one of signal strength of said point, distance from said measurement instrument to said point and measurement time for said point.

14. The measurement instrument according to claim 13, wherein said control unit is configured to define measurement properties for the detection of each point on said new scan line based on said measurement parameters of said at least one point having a corresponding location in at least one preceding scan line.

15. The measurement instrument according to claim 14, wherein said control unit is configured to set at least one of a distance range, at least one of upper and lower signal strength limits and at least one of upper and lower measurement time limits for the detection of each point on said new scan line based on said measurement parameters of said at least one point having a corresponding location in at least one preceding scan line.

16. The measurement instrument according to claim 11, wherein said control unit is configured to perform a correction measurement session including,
obtain a plurality of points in each of a number of correction subsets of said scanning area of said object detected by said position calculating circuit; and
upon detection of a new point in said new subset, instruct said position calculating circuit to use information related to at least one point having a corresponding location in at least one preceding correction subset, said preceding correction subset being adjacent to a new correction subset in said grid configuration.

17. The measurement instrument according to claim 16, wherein said control unit is further configured to,
upon detection of a new point in said new subset, instruct said position calculating circuit to use information related to a point having a corresponding location in a subset obtained during a preceding measurement session.

18. The measurement instrument according to claim 11, wherein said control unit is configured to define said scanning area, and wherein said scanning area comprises at least one polygonally shaped area.

19. The measurement instrument according to claim 11, wherein said control unit is configured to define a resolution of said points of said scanning area or a total scanning time for said scanning area.

* * * * *